United States Patent [19]

Lowe et al.

[11] Patent Number: 5,085,846
[45] Date of Patent: Feb. 4, 1992

[54] PROCESS FOR PRODUCING PHOSPHOROUS ACID

[75] Inventors: Edward J. Lowe, Stourbridge; William S. Holmes, Wolverhampton, both of England

[73] Assignee: Albright & Wilson Limited, Oldbury, England

[21] Appl. No.: 685,460

[22] Filed: Apr. 11, 1991

[30] Foreign Application Priority Data

Apr. 12, 1990 [GB] United Kingdom ............... 9008406

[51] Int. Cl.$^5$ ............................................. C01B 25/16
[52] U.S. Cl. .................................................... 423/316
[58] Field of Search ............................. 423/316, 317

[56] References Cited

U.S. PATENT DOCUMENTS

| | | | |
|---|---|---|---|
| 2,670,274 | 2/1954 | Jones | 423/316 |
| 2,684,286 | 7/1954 | Kreega | 423/316 |
| 4,261,916 | 4/1981 | Crosby | 266/458 R |

FOREIGN PATENT DOCUMENTS 975914 11/1964 United Kingdom.
1563995 8/1976 United Kingdom.

Primary Examiner—Gregory A. Heller
Attorney, Agent, or Firm—Frishauf, Holtz, Goodman & Woodward

[57] ABSTRACT

Phosphorous acid is made by a continuous recycling process from a mixture of phosphorous and hydrochloric acids, comprising:

(i) continuously recycling the mixture in a loop apparatus;
(ii) adding water to and passing phosphorus trichloride into said recycling mixture so as to generate a condition of turbulent flow at the point of contact of the phosphorus trichloride and the recycling mixture, whereby a reaction product, comprising an aqueous solution of phosphorous and hydrochloric acids as a continuous liquid phase and gaseous hydrogen chloride as gas bubbles of disperse phase, is produced;
(iii) separating said gaseous hydrogen chloride;
(iv) cooling said reaction product; and
(v) recycling at least a portion of said reaction product and repeating steps (ii), (iii) and (iv) thereon to produce a more highly concentrated solution of phosphorus acid.

21 Claims, 1 Drawing Sheet

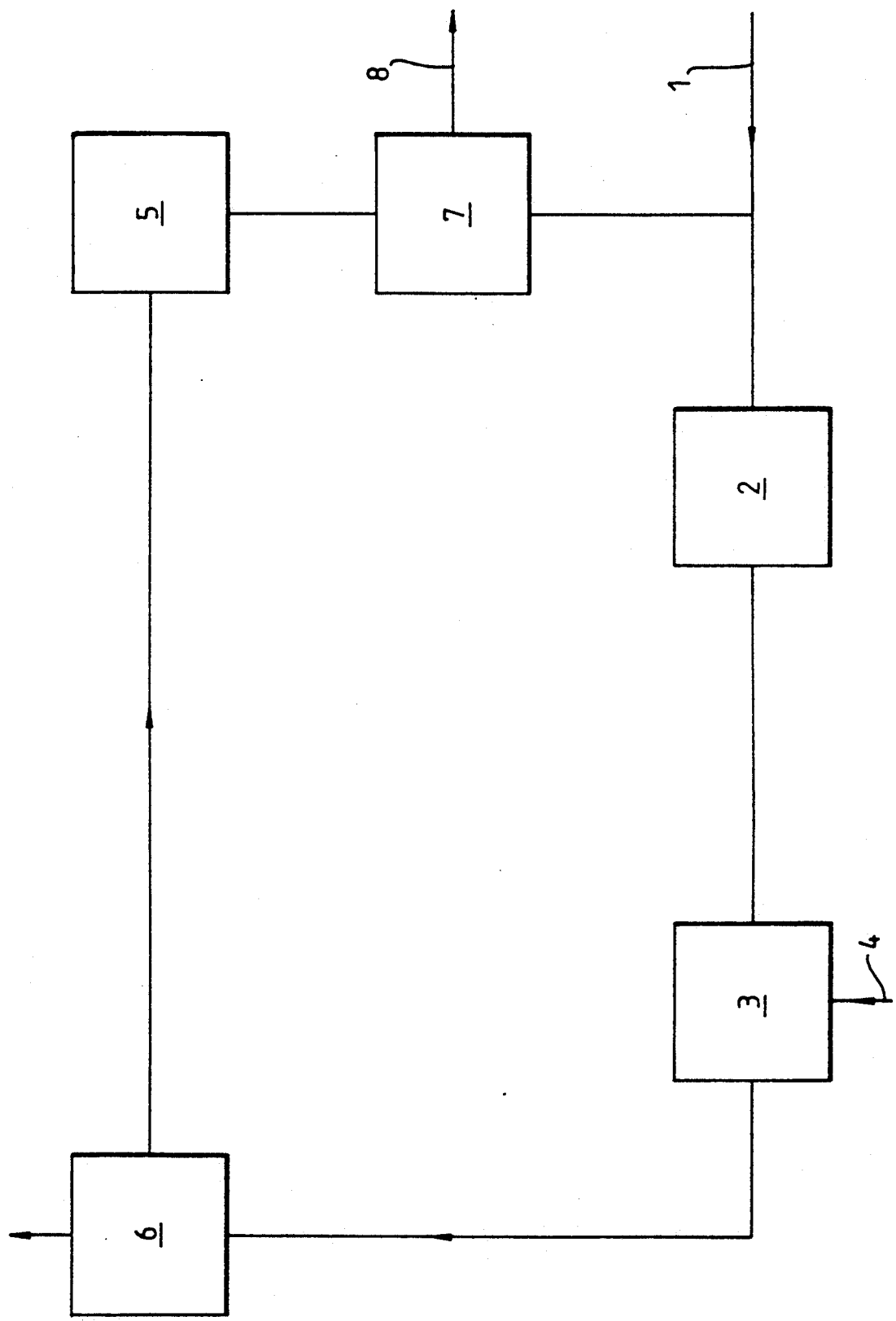

PROCESS FOR PRODUCING PHOSPHOROUS ACID

This invention relates to the preparation of phosphorous acid.

Commercially phosphorous acid is made by the hydrolysis of phosphorus trichloride with water preferably in the form of concentrated hydrochloric acid; the reaction is preferably kept cool throughout. The resulting phosphorous acid product is concentrated to remove water and by product hydrogen chloride by evaporation at temperature not above 180° C.

In a previously described process phosphorus trichloride is fed into the lower part of a column down which descends a liquid medium comprising phosphorous acid, hydrochloric acid and water. The heat of the reaction produces a gas phase comprising phosphorus trichloride and hydrogen chloride which bubble upwards. The gas phase is countercurrently scrubbed and hydrolysed in an upper part of the column down which passes aqueous hydrochloric acid and phosphorous acid to produce more aqueous phosphorous acid and hydrochloric acid, which falls into the lower part. The reaction product containing phosphorous acid and hydrochloric acid and water is recycled from the bottom of the column to the top as scrubbing liquor and the rest is removed as product and evaporated to remove most of the hydrogen chloride. Problems with this process are the capital and operating costs of the column and scrubber.

We have now discovered a process with much simpler and cheaper equipment capable of producing the phosphorous acid.

The present invention provides a process for the production of phosphorous acid by reaction of phosphorus trichloride with a mixture of phosphorous acid and hydrochloric acid, said process consisting of the following steps:

(i) continuously recycling the mixture in a loop apparatus;
(ii) adding water to and passing phosphorus trichloride into said recycling mixture so as to generate a condition of turbulent flow at the point of contact of the phosphorus trichloride and the recycling mixture, whereby a reaction product, comprising an aqueous solution of phosphorous and hydrochloric acids as a continuous liquid phase and gaseous hydrogen chloride as gas bubbles of disperse phase, is produced;
(iii) separating said gaseous hydrogen chloride;
(iv) cooling said reaction product; and
(v) recycling at least a portion of said reaction product and repeating steps (ii), (iii) and (iv) thereon to produce a more highly concentrated solution of phosphorus acid.

The process may be performed in a loop apparatus including separate inlets for water for and phosphorus trichloride, a gas separator, one or more mixers, cooling means and one or more pumps. There may be 2 or 3 mixers, the second and third ones being preferably in-line mixers such as helical and cross bar mixers.

Phosphorus trichloride is mixed into the recirculating liquid which is in a condition of turbulent flow, in at least one and preferably at least two mixers. A variety of mixers can be used, e.g. those described in "Chemical Engineers Handbook", Ed. R. H. Perry and C. H. Chilton, McGraw Hill Book co., New York, 5th edition, 1973, Section 21, pages 4-8, such as jet mixers, orifice plate mixers, "Kenic" mixers, nozzle mixers and centrifugal pumps and mechanically agitated mixers, such as "Silverson" mixers (whether the rotors in the mixer are operated or not), all known Der se. In each case the input for the phosphorus trichloride is positioned such that its end is in a region of turbulence in the mixer.

The mixer is preferably a static mixer with no moving parts. Examples of such mixers are orifice plate, Kenic, Venturi, "Silverson" and jet mixers, as well as arrangements in which the inlet pipe for the phosphorus trichloride and the pipes carrying the recycled liquid are so disposed e.g. in serpentine or other manner that, with the aid of baffles if necessary or desired, there is the necessary turbulent flow under the conditions of temperature, pressure, concentrations of chemicals and flow rates operating in the process. Advantageously there is a static mixer as well as the arrangements of pipes and optionally baffles.

Especially important are orifice plate mixers which comprise a plate disposed across the reaction liquid flow with at least one axial orifice through which the liquid passes, the act of passage causing production of turbulent flow in the orifice upstream and downstream of the orifice. Preferably the phosphorus trichloride is passed through a pipe whose exit is in the turbulent region in the vicinity of the orifice, or in the orifice itself. The phosphorus trichloride may be passed into the turbulent region from a direction parallel with, e.g. coaxial with, the bulk direction of flow. The inlet pipe for the phosphorus trichloride can pass throughout the orifice as shown in British Patent Specification No 975914, or with the inlet pipe surrounded by the reaction liquid upstream of the orifice and the end of the inlet pipe in the orifice instead of passing through it. Alternatively the inlet pipe can pass from outside the line carrying the reaction mixture directly into the turbulent region downstream of the orifice, usually normal to the bulk direction of flow of the reaction liquid.

Most preferably the mixer is a turbulent flow orifice plate mixer which comprises an orifice which is substantially perpendicular to the plate, and a port in the internal wall of the orifice, the recycling liquid flowing through the orifice and the phosphorus trichloride passing through the port. The orifice constitutes a bore through the plate with the port constituting a passage in the wall of the bore.

The ratio of the diameter of the orifice to the thickness of the plate, i.e. the length of the orifice is usually at least 0.1:1, e.g. 0.1:1 to 50:1 preferably 0.25:1 to 20:1 and especially 0.25:1 to 10:1. It will be understood that references to a "plate" herein include a fabricated construction made up of two thin plates joined together, the space between them being such as to accommodate a feed pipe to the port. The "orifice" then takes the form of a short length of pipe between the two thin plates. If desired there may be more than one port, e.g. 2-4 ports in the internal wall of the orifice. The duct leading the phosphorus trichloride to the port in the wall of the orifice may be drilled through the thickness of the plate, conveniently in a radial direction. It is not, however, essential that the port be flush with the internal wall, and it is possible to introduce a pipe or collar projecting beyond the wall in a radial, upstream or downstream direction. Preferably the mixer comprises an integral plate in which an axial bore or orifice and at least one radial duct or port have been fabricated e.g. drilling, the orifice having the port in its internal wall. The plate may be of circular, square or rectangular cross section with the orifice preferably at its centre; the centre of the port is preferably about equally spaced from the ends of the orifice, e.g. at a distance of 40-60% of the length of the orifice, from the end of the orifice. The dimensions of the turbulent flow plate mixer should be such, in relation to the mass density of the mixture of water and recycling liquid medium its viscosity and linear velocity in the orifice, that the flow in the orifice is turbulent. The greater the diameter of the orifice for the constant volume of fluid through the orifice the smaller the degree of turbulence and the less pressure drop across the plate, so that the choice of diameter is a compromise between the desire for maximum turbulence and avoidance of a high pressure drop requiring maximum power input. In general the design will be a compromise of the conflicting requirements of high throughput and turbulence with a reasonable applied pump pressure on the one hand and a high pressure drop across the plate on the other. The turbulent flow orifice plate mixer can be of simple construction and the conditions for successful operation of small scale processes can be scaled up for larger scale processes easily. Such mixers are described in BP1563995.

The turbulent flow is maintained in the mixer or mixers and throughout the reaction zone until the hydrolysis of the phosphorus trichloride is substantially complete. The turbulent flow is achieved by use of the mixers and also in the loop circuit through which the liquid flows there is a pump; the requirement for turbulent flow necessitates a pump operating at a high pumping rate. Most pumps and heat exchangers for cooling the reaction mixture keep turbulent a liquid fed thereinto in a state of turbulent flow. Fixed pressure pumps, e.g. centrifugal pumps are preferred, though any other pump capable of a high pumping rate may be used. It is possible for the mixer also to act as a pump, e.g. with the Silverson mixer with the rotor operating, but preferably the mixers and pump are separate.

The recycle loop system also contains at least means for cooling, an outlet for hydrogen chloride gas and an outlet for the reaction product.

The cooling means is preferably between the mixers and the outlets for hydrogen chloride gas in the direction of liquid flow, but may be between the gas separator and pump in the direction of flow. The cooling means may be heat exchangers such as in-line direct coolers fed with cooling water or may be constituted by an external recycle loop in which the cooling is effected by a portion of the reaction material being pumped externally through an external heat exchanger and returned cooled to the loops.

Preferably, the water and the phosphorus trichloride are passed continuously into the loop apparatus and the reaction product is removed continuously therefrom.

The temperature of the recycling mixture as it enters the mixer before reaction with phosphorus trichloride is governed by the nature of the materials of construction of the loop but is primarily governed by the need to control the viscosity of the liquid particularly with recycling liquids containing at least 80% phosphorous acid, the lower limit of the temperature being that to maintain a viscosity such that there is turbulent flow, e.g. 50° C., the upper limit being preferably 180° C. especially 90° C. Generally there is no externally applied vacuum on the loop system in which the reaction mixture and reaction liquid are kept. The loop system is usually maintained with an external pressure of at least substantially atmospheric, e.g. up to 10 atmospheres.

The materials of construction of the loop are such as not to be adversely affected by the corrosive liquid flowing therein e.g. thermo plastics at temperatures of up to 100° C. and alloy steels at above that temperature. Metal pipes may be glass or polytetrafluoroethylene (PTFE) lined.

The concentration of phosphorous acid in the recycling liquid can be 50-99% e.g. 65-98% especially 70-90% with the remainder being water and hydrochloric acid. The water added to the loop should be at least sufficient to hydrolyse the phosphorus trichloride added at the mixer stage and preferably is in the form of aqueous hydrochloric acid. The water may be added to the loop between the pump and the mixer or between the outlet for product and the pump.

The amount of water is preferably 1-3 times e.g. 1-2 times that needed to hydrolyse the phosphorus trichloride, thus 3-9 or 3-6 moles of water may be used per mole of phosphorus trichloride.

The portion of the reaction mixture taken out of the system preferably constitutes a twentieth to a two thousandth of the weight of the remainder of the reaction mixture recycled i.e. a recycle ratio of recycled reaction product to removed reaction product of 20:1 to 2000:1, preferably 30:1 to 500:1, e.g. 30:1 to 200:1 and especially 40-150:1.

The process of the invention may be performed without the need to use a hydrolysing column because phosphorus trichloride is essentially completely hydrolysed before the outlet for hydrogen chloride gas is reached, so there is essentially no phosphorus trichloride entrained in the vapour phase. Suitable equipment is used to remove the hydrogen chloride gas and any entrained phosphorous acid from the hydrogen chloride—for example, an in-line cyclone. If desired a hold-up vessel may be present in the loop to cope with start up and to cope with irregularities in input and output flow rates and to provide a head of liquid above the pump. Conveniently the vessel may be used with a mist entrainer instead of or as well as the cyclone or other gas separator. The vessel may also be the point of entry of the input reaction water. In the gas separator and/or vessel there is a substantial gas/liquid interface at which the gas is liberated from the liquid which, while not necessarily quiescent, is not as turbulent as in the mixer. Thus in the separator the 2 phase mixture of continuous liquid phase and disperse phase bubbles becomes two separate phases of liquid and gas. In the separator there is usually a substantial horizontal gas interface.

BRIEF DESCRIPTION OF THE DRAWING

The process maybe performed in a loop apparatus, as shown in the accompanying drawing which is a block diagram of the loop which has an input line 1, a pump 2, turbulent flow mixer 3, input line 4 to mixer 3, a heat exchanger 5, a gas separator 6, a hold up vessel 7 and an out put line 8. If desired the heat exchanger 5 and hold up vessel 7 may be combined (not shown). The relative positions of the heat exchanger 5 and separator 6 may be reversed (not shown). Preferably the same apparatus may be used without the hold up vessel 7.

In operation of the loop a mixture of aqueous phosphorous acid and hydrogen chloride product (referred to hereinafter as a "heel") is circulated round the loop by pump 2. Water or aqueous hydrochloric acid is passed into the loop from line 1 and the mixture of it and the heel is drawn through pump 2 and rendered turbulent, so that the mixture is turbulent at the point in mixer 3 where phosphorus trichloride enters the loop from line 4, the reaction material produced being then pumped further round the loop.

The hydrolysis reaction is substantially complete by the time the liquid reaches the gas separator 6 and when the heat exchanger 5 comes before the separator, then the reaction is substantially complete before the liquid reaches the exit from the heat exchanger, and preferably before it arrives at the entrance. Hydrogen chloride gas in the reaction material is separated in gas separator 6. The remaining liquid passes to hold up vessel 7 and then a small portion of the reaction material is removed through line 8 as product and the remainder is recycled for contact with the water or aqueous acid from line 1. Vessel 7 has a horizontal gas liquid interface and may contain a heat exchanger in the liquid though if desired the contents of the vessel may be circulated externally of the loop through an external heat exchanger (not shown). If desired the product may be removed in line 8 directly from the loop, rather than from the vessel 7.

The mixer is one which imparts turbulence to the liquid flowing through it at the point of introduction of the phosphorus trichloride and thereafter in the reaction zone. Various types of mixer have been described above but preferably the mixer is an orifice plate mixer with 1 or more radial ports. Advantageously between the mixer 3 and gas separator 6 or heat exchanger 5 are one or preferably two in line mixers (not shown).

The process is illustrated in the following Examples in which apparatus as described with reference to the accompanying drawing was used with the modifications that the heat exchanger 5 was exterior to the loop operating to cool liquid recycled from the vessel 7, and line 1 entered vessel 7 rather than directly onto the loop and there were two static in-line mixers between the mixer 3 and the separator 6. The mixer was an orifice plate mixer with 1 radial port (as shown in BP1563995) through which phosphorus trichloride was passed while the loop contents passed through the orifice; the ratio of the diameter of the orifice to the thickness of the plate was 1:1.5.

After the orifice plate mixer the reactant liquids passed through 2 in-line Kenic mixers before reaching the gas separator, which was a cyclone with the effluent gas vented to the atmosphere so the process was operated under substantially no externally applied pressure. All parts and percentages are by weight.

EXAMPLE 1

29,740 parts/hr of recycle product of 68% phosphorous acid and water saturated with hydrogen chloride were mixed with an input feed of 260 parts/hr of water and the mixture circulated at 500 parts/min. The liquid produced was mixed with 470 parts/hr phosphorus trichloride to produce 417 parts/hr of aqueous phosphorous acid product containing hydrogen chloride and 336 parts/hr of gaseous hydrogen chloride, which contained an amount of phosphorus trichloride which was 0.1% of the input phosphorus trichloride. The weight ratio of liquid recycled round the loop to that removed—"the recycle ratio"—was about 71:1. The temperature of the liquid in the hold up vessel was 77° C.

EXAMPLE 2

The process of Example 1 was repeated with 29600 parts/hr of recycle product of 57% phosphorous acid 15% hydrogen chloride and the rest water, 400 parts/hr of extra water and 628 parts/hr phosphorous trichloride to produce 664 parts/hr of product and 509 parts/hr of hydrogen chloride containing 0.17% of the phosphorus trichloride feed. The heel was recirculated at 500 parts/min. The recycle ratio was 44:1. The temperature of the liquid in the vessel was 76° C.

EXAMPLE 3

The process of Example 1 was repeated with the difference that there were 3 in-line mixers as well as the orifice plate mixer. The input feeds were 220 parts/hr of water and 471 parts/hr of phosphorus trichloride to produce 330 parts/hr of product of 85% phosphorous acid, 5.5% hydrogen chloride and the rest water and 357 parts/hr of gaseous hydrogen chloride containing 0.7% of the input P values. The recycle ratio was 90:1. The temperature of the liquid in the vessel was 75°–80° C.

EXAMPLE 4

The process of Example 1 was repeated with a venturi mixer instead of the orifice plate mixer and in-line mixers. The liquid in the loop was circulated at 2000 parts/min, while 2 parts/min of phosphorus trichloride and 0.78 parts/min of water were added. The product produced at 1.48 parts/min rate was 81% aqueous phosphorous acid 6.65% hydrogen chloride and the rest water. The reaction temperature in the vessel was 55°–60° C. The recycle ratio was 135:1.

We claim:

1. A process for the production of phosphorous acid by the reaction of phosphorus trichloride with a mixture of phosphorous acid and hydrochloric acid, said process consisting of the following steps:
   (i) continuously recycling the mixture in a loop apparatus at a temperature in the range of 50° C. to 180° C.;
   (ii) adding water to and passing phosphorus trichloride into said recycling mixture so as to generate a condition of turbulent flow at the point of contact of the phosphorus trichloride and the recycling mixture, whereby a reaction product, comprising an aqueous solution of phosphorous and hydrochloric acids as a continuous liquid phase and gaseous hydrogen chloride as gas bubbles of disperse phase, is produced, the amount of water added is sufficient to hydrolyze the phosphorus trichloride;
   (iii) separating said gaseous hydrogen chloride;
   (iv) cooling said reaction product; and
   (v) recycling at least a portion of said reaction product and repeating steps (ii), (iii) and (iv) thereon to produce a more highly concentrated solution of phosphorus acid.

2. The process of claim 1, wherein said loop apparatus comprises separate inlets for said water and said phosphorus trichloride, together with a gas separator, at least one mixer, cooling means and at least one pump.

3. The process of claim 1, wherein said loop apparatus includes two or three mixers.

4. The process of claim 3, wherein at least one of said two or three mixers is a static mixer having no moving parts.

5. The process of claim 4, wherein said mixer is a turbulent-flow orifice plate mixer having an orifice substantially perpendicular to said plate and a port in the internal wall of said orifice, whereby said recycling liquid mixture flows through said orifice and phosphorus trichloride passes through said port.

6. The process of claim 5, wherein said orifice has a ratio of diameter to length which is in the range 0.1:1 to 50:1.

7. The process of claim 6, wherein ratio is in the range of 0.25:1 to 20:1.

8. The process of claim 6, wherein said ratio is in the range 0.25:1 to 10:1.

9. The process of claim 1, wherein said water and said phosphorus trichloride are passed continuously into said loop apparatus and said reaction product is removed continuously therefrom.

10. The process of claim 1, wherein said temperature is in the range 50° C. and 90° C.

11. The process of claim 1, wherein said concentration of phosphorous acid in said recycling liquid mixture is from 50% to 99%.

12. The process of claim 11, wherein said concentration is from 70% to 90%.

13. The process of claim 1, wherein the amount of water added to said recycling liquid mixture is from 3 and 9 moles of water per mole of phosphorus trichloride.

14. The process of claim 13, wherein said amount of water is from 3 to 6 moles of water per mole of phosphorus trichloride.

15. The process of claims 9, wherein the ratio of said recycled reaction product to said removed reaction product is in the range 20:1 to 2000:1.

16. The process of claim 15, wherein said ratio is in the range 30:1 to 200:1.

17. The process of claim 15, wherein said ratio is in the range 40:1 to 150:1.

18. The process of claim 11, wherein the amount of water added to said recycling liquid mixture is from 3 and 9 moles of water per mole of phosphorus trichloride; and the ratio of said recycled reaction product to said removed reaction product is in the range 20:1 to 2000:1.

19. The process of claim 18, wherein
said temperature is in the range of 50° C. and 90° C.;
said concentration is from 70% to 90%;
said amount of water is from 3 to 6 moles of water per mole of phosphorus trichloride; and
said ratio is in the range 40:1 to 150:1.

20. The process of claim 18, wherein
said loop apparatus comprises separate inlets for said water and said phosphorus trichloride, together with a gas separator, a static mixer having no moving parts, cooling means and at least one pump;
said mixer is a turbulent-flow orifice plate mixer having an orifice substantially perpendicular to said plate and a port in the internal wall of said orifice, whereby said recycling liquid mixture flows through said orifice and phosphorus trichloride passes through said port;
said orifice has a ratio of diameter to length which is in the range 0.1:1 to 50:1; and
said water and said phosphorus trichloride are passed continuously into said loop apparatus and said reaction product is removed continuously therefrom.

21. The process of claim 20, wherein said ratio of orifice diameter to length is in the range 0.25:1 to 10:1.

* * * * *